(12) United States Patent
Sato

(10) Patent No.: US 7,991,276 B2
(45) Date of Patent: Aug. 2, 2011

(54) OPTICAL IMAGE STABILIZER AND OPTICAL APPARATUS

(75) Inventor: Shigeki Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 12/355,296

(22) Filed: Jan. 16, 2009

(65) Prior Publication Data
US 2009/0185273 A1    Jul. 23, 2009

(30) Foreign Application Priority Data

Jan. 18, 2008   (JP) .................................. 2008-009759

(51) Int. Cl.
*G03B 17/00* (2006.01)
(52) U.S. Cl. .......................................... 396/55; 359/554
(58) Field of Classification Search ................... 396/55; 359/554
See application file for complete search history.

(56) References Cited

U.S. PATENT DOCUMENTS

| 5,897,226 | A | 4/1999 | Okada et al. |
| 5,974,269 | A | 10/1999 | Sato et al. |
| 6,327,433 | B1 * | 12/2001 | Ishikawa et al. ................. 396/55 |
| 6,694,096 | B1 * | 2/2004 | Imada .............................. 396/52 |
| 2004/0022530 | A1 * | 2/2004 | Okazaki et al. .................. 396/55 |
| 2005/0129392 | A1 * | 6/2005 | Shinohara ........................ 396/50 |
| 2005/0169618 | A1 * | 8/2005 | Akada ............................. 396/55 |
| 2006/0082674 | A1 * | 4/2006 | Noji ............................... 348/360 |

FOREIGN PATENT DOCUMENTS

| JP | 08-087046 A | 4/1996 |
| JP | 10-142647 A | 5/1998 |
| JP | 10-333200 A | 12/1998 |

OTHER PUBLICATIONS

Abstracts for Japan Patent Nos. 10-142647, 08-087046, 10-333200.

* cited by examiner

*Primary Examiner* — W. B. Perkey
*Assistant Examiner* — Linda B Smith
(74) *Attorney, Agent, or Firm* — Canon U.S.A., Inc. I.P. Division

(57) ABSTRACT

The optical image stabilizer shifts an image stabilizing element with respect to an optical axis of an optical system to reduce image shake. The stabilizer includes a lock ring which is rotatable to a lock position to limit shift of the image stabilizing element and to a lock-releasing position to allow the shift of the image stabilizing element, an actuator which rotates the lock ring to the lock position and the lock-releasing position, and a biasing mechanism which mechanically biases the lock ring rotated to the lock position toward the lock position and biases the lock ring rotated to the lock-releasing position toward the lock-releasing position.

12 Claims, 6 Drawing Sheets

LOCKED STATE

ASSEMBLED STATE

LOCKED STATE

UNLOCKED STATE

OPTICAL IMAGE STABILIZER AND OPTICAL APPARATUS

BACKGROUND OF THE INVENTION

The present invention relates to an optical apparatus such as a digital still camera, a video camera, and an interchangeable lens, and to an optical apparatus having an optical image stabilizer that shifts an image stabilizing element such as a lens to perform optical image stabilization (image shake correction).

Many optical apparatuses include an optical image stabilizer that shifts a lens with respect to an optical axis of an optical system in order to reduce image shake caused by shake such as hand jiggling.

Such an optical image stabilizer has a shake sensor which detects the shake of the optical apparatus in a pitch direction and a yaw direction, and an actuator which shifts the lens with respect to the optical axis based on outputs from the shake sensor. Moreover, many optical image stabilizers include a lock mechanism which limits (locks) the shift of the lens so that the lens is unexpectedly shifted with respect to the optical axis of the optical system when an image stabilizing operation is not performed.

Japanese Patent No. 3618798 discloses an example as a lock mechanism. In this lock mechanism, a rotatable lock member is always biased toward a lock position by spring force. When an image stabilizing operation is performed, the lock member is rotated to a lock-releasing position by an actuator (motor), and is attracted by an electromagnet to be held at the lock-releasing position.

Further, Japanese Patent Laid-Open No. 10-142647 discloses a lock mechanism in which a rotatable lock member is driven by a stepping motor.

However, in the lock mechanism disclosed in Japanese Patent No. 3618798, it is necessary to hold the lock member at the lock-releasing position by energizing the electromagnet during the image stabilizing operation. Therefore, it is necessary to continue energization of the electromagnet during the image stabilizing operation, which increases power consumption.

On the other hand, in the lock mechanism disclosed in Japanese Patent Laid-Open No. 10-142647, the lock member can be held at the lock-releasing position by utilizing cogging force (self-holding force) generated in the stepping motor in a non-energized state, which results in a reduction in power consumption. However, when rotating force which exceeds the cogging force and is caused by external force such as impact acts on the lock member, the lock member is rotated from the lock-releasing position, which may bring discontinuance of the image stabilizing operation.

BRIEF SUMMARY OF THE INVENTION

The present invention provides an optical image stabilizer capable of stably holding a lock member at a lock position and at a lock-releasing position while reducing power consumption, and an optical apparatus having the optical image stabilizer.

The present invention provides as one aspect thereof an optical image stabilizer which shifts an image stabilizing element with respect to an optical axis of an optical system to reduce image shake. The optical image stabilizer includes a lock ring which is rotatable to a lock position to limit shift of the image stabilizing element and to a lock-releasing position to allow the shift of the image stabilizing element, an actuator which rotates the lock ring to the lock position and the lock-releasing position, and a biasing mechanism which mechanically biases the lock ring rotated to the lock position toward the lock position and biases the lock ring rotated to the lock-releasing position toward the lock-releasing position.

The present invention provides as another one aspect thereof an optical apparatus includes an optical image stabilizer which shifts an image stabilizing element with respect to an optical axis of an optical system to reduce image shake. The optical image stabilizer includes a lock ring which is rotatable to a lock position to limit shift of the image stabilizing element and to a lock-releasing position to allow the shift of the image stabilizing element, an actuator which rotates the lock ring to the lock position and the lock-releasing position, and a biasing mechanism which mechanically biases the lock ring rotated to the lock position toward the lock position and biases the lock ring rotated to the lock-releasing position toward the lock-releasing position.

Other aspects of the present invention will be apparent from the embodiment described below with reference to the drawings.

DETAILED DESCRIPTION OF THE EMBODIMENTS

An exemplary embodiment of the present invention will be described below with reference to the accompanied drawings.

Figure 1:
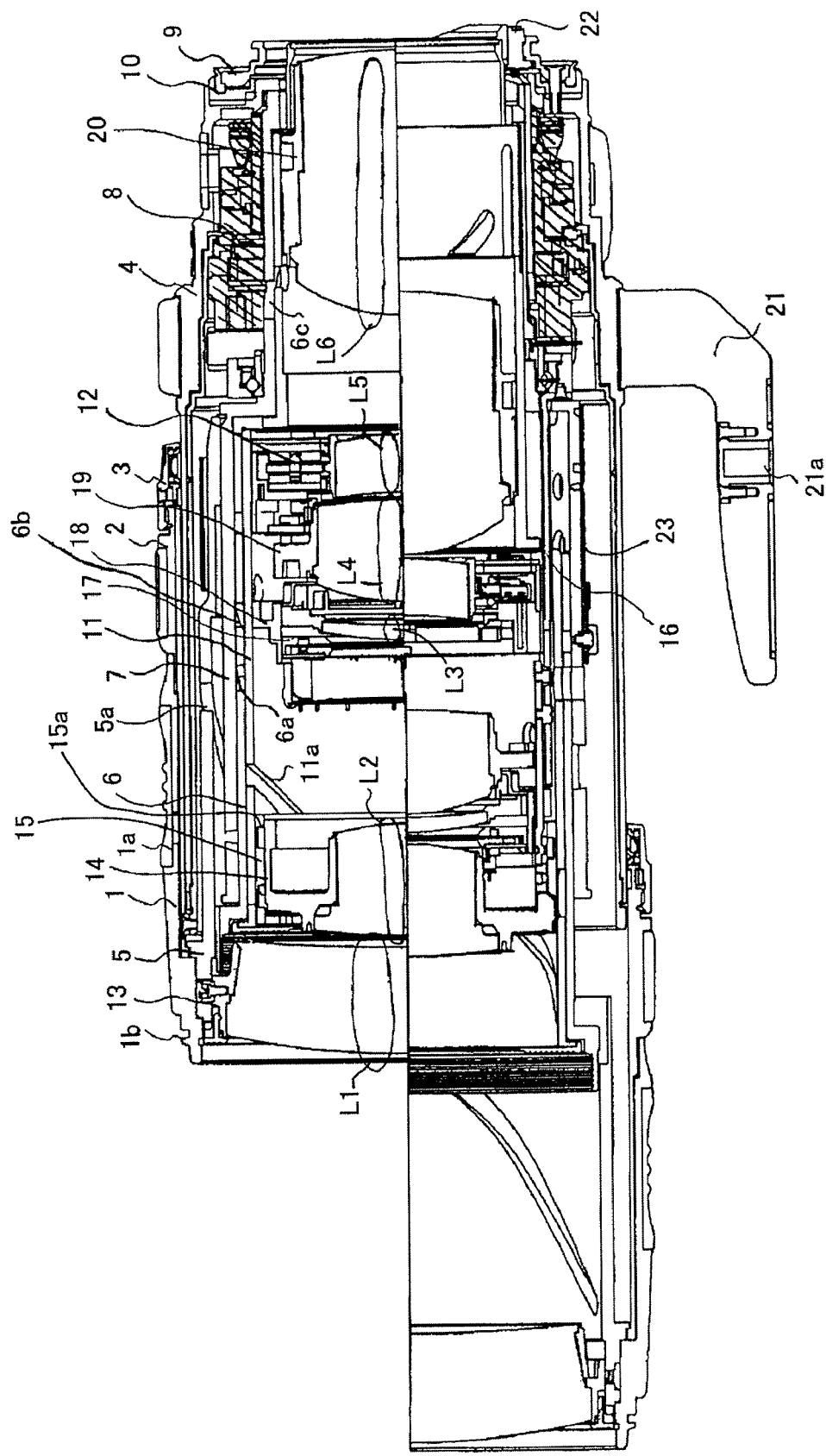
FIG. 1 is a cross-sectional view illustrating a lens apparatus that is an embodiment of the present invention.

FIG. 1 shows the configuration of a lens apparatus serving as an optical apparatus that is an embodiment of the present invention. The lens apparatus is an interchangeable lens (zoom lens) for a single-lens reflex camera, and the upper part above the center line in the figure shows the configuration at a wide-angle end, and the lower part under the center line shows the configuration at a telephoto end. The following description defines an object side as a front side, and an image side as a rear side.

Reference symbols L1 to L6 respectively denote first to sixth lens units constituting an image-pickup optical system. Reference numeral 1 denotes a zoom operating ring. A rotating operation of the zoom operating ring 1 moves the first to sixth lens units in a direction of an optical axis (hereinafter referred to as an optical axis direction) of the image-pickup optical system to change a focal length of the image-pickup optical system. A rubber ring 1a is attached to an outer circumference of the zoom operating ring 1 in order to facilitate its operation. Further, a front end of the zoom operating ring 1 has a pawl 1b on which a light-shading hood is attached.

A focus operating ring 2 and a zoom operation adjusting ring 3 are provided at a rear end of the lens apparatus. A rotating operation of the focus operating ring 2 moves the second lens unit L2 in the optical axis direction for focusing. Further, a rotating operation of the zoom operation adjusting ring 3 changes the strength of friction between the zoom operation adjusting ring 3 and a fixed barrel 4 provided thereinside, which enables adjustment of an operation load of the zoom operating ring 1.

Reference numeral 5 denotes a straight-movable barrel that moves in the optical axis direction along with a first lens barrel 13 holding the zoom operating ring 1 and the first lens unit L1. The straight-movable barrel 5 is provided with a cam 5a. Reference numeral 6 denotes a zoom cam ring. The zoom cam ring 6 is provided with a cam follower (not shown) engaged with the cam 5a in the straight-movable barrel 5. Rotation of the zoom cam ring 6 moves the first lens unit L1 and the first lens barrel 13 in the optical axis direction. The zoom cam ring 6 moves in the optical axis direction with rotation.

In the optical axis direction, a movement amount of the zoom cam ring 6 is the same as that of an image stabilizing unit (optical image stabilizer) 12 which will be described later and includes the fifth lens unit L5.

The image stabilizing unit 12 is fixed to a fifth movable barrel 11. A follower (not shown) provided to the fifth movable barrel 11 is engaged with a groove portion (not shown) formed in the zoom cam ring 6 so as to circumferentially extend. Therefore, the image stabilizing unit 12 (fifth lens unit L5) is moved in the optical axis direction together with the zoom cam ring 6 without rotation.

Reference numeral 7 denotes a guiding barrel constituting part of a fixed part of the lens apparatus, and its rear portion holds a focus unit 8 including a vibration type motor and a transmission mechanism transmitting rotation of the motor and rotation of the focus operating ring 2 to a focus key 16. Further, the fixed barrel 4 and a mount 9 are fixed to a rear end of the guiding barrel 7 with screws.

Reference numeral 10 denotes a drip-proof rubber that prevents inflow of droplets to a joint part of the mount 9 and a mount which is provided to the camera and not shown.

Reference numeral 14 denotes a second lens barrel holding the second lens unit L2. Reference numeral 15 denotes a focus cam ring provided on an outer circumference of the second lens barrel 14. The focus cam ring 15 is provided with a cam follower (not shown) engaged with a guide groove portion (not shown) formed in the zoom cam ring 6 so as to extend in the optical axis direction and a cam groove portion 11a formed in the fifth movable barrel 11. When the zoom cam ring 6 rotates, the focus cam ring 15 is rotated and moved in the optical axis direction and the second lens barrel 14 (second lens unit L2) is moved in the optical axis direction without rotation.

The above-described rotation of the focus key 16 is transmitted to the second lens barrel 14. When the second lens barrel 14 is rotated with respect to the focus cam ring 15, the focus cam 15a formed on the inner circumference of the focus cam ring 15 moves the second lens barrel 14 in the optical axis direction for focusing. The image-pickup optical system in the present embodiment is an optical system in which a movement amount of the second lens unit L2 (second lens barrel 14) for focusing varies depending on the focal length. The focus cam ring 15 is rotated in accordance with variations of the focal length to change a use area of the focus cam 15a, thereby changing the movement amount of the second lens barrel 14 in the optical axis direction.

Reference numeral 18 denotes a third lens barrel holding the third lens unit L3. An aperture stop unit 17 is fixed to a front part of the third lens barrel 18, which means that the aperture stop unit 17 is disposed more forward than the third lens unit L3. The third lens barrel 18 is provided with a cam follower (not shown) engaged with a cam groove portion 6a formed in the zoom cam ring 6 and a straight groove portion (not shown) formed in the fifth movable barrel 11. Therefore, rotation of the zoom cam ring 6 moves the third lens barrel 18 (third lens unit L3) and the aperture stop unit 17 in the optical axis direction.

Reference numeral 19 denotes a fourth lens barrel holding the fourth lens unit L4. The fourth lens barrel 19 is provided with a cam follower (not shown) engaged with a cam groove portion 6b formed in the zoom cam ring 6 and a straight groove portion (not shown) formed in the fifth movable barrel 11. Rotation of the zoom cam ring 6 moves the fourth lens barrel 19 (fourth lens unit L4) in the optical axis direction.

Reference numeral 20 denotes a sixth lens barrel holding the sixth lens unit L6. The sixth lens barrel 20 is provided with a cam follower (not shown) engaged with a cam groove portion 6c formed in the zoom cam ring 6 and a straight groove portion (not shown) formed in the guiding barrel 7. Rotation of the zoom cam ring 6 moves the sixth lens barrel 20 (sixth lens unit L6) in the optical axis direction.

Reference numeral 21 denotes a tripod mount which has a screw part 21a for fixing the lens apparatus to a tripod.

Reference numeral 23 denotes a control circuit of the lens apparatus, which is arranged so as to surround an outer circumference of the guiding barrel 7. A shake sensor (angular velocity sensor) such as a vibratory gyroscope that detects shakes of the lens apparatus is soldered to the control circuit 23 to be fixed to the guiding barrel 7 via a rubber.

Further, reference numeral 22 denotes contacts for electrically connecting the control circuit 23, the focus unit 8, the image stabilizing unit 12, and the aperture stop unit 17 with the camera.

Figure 2:
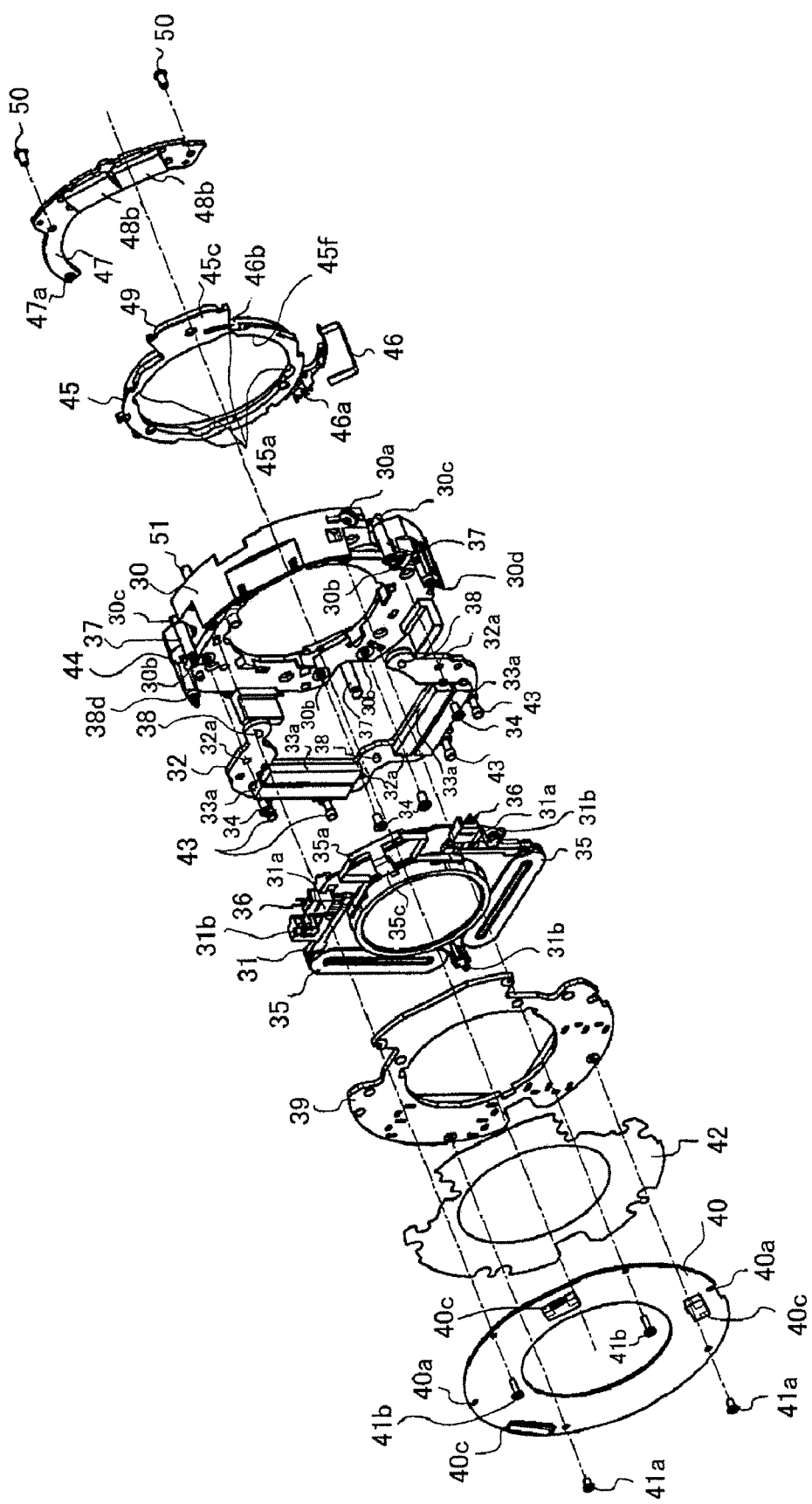
FIG. 2 is an exploded perspective view of an image stabilizing unit to be mounted in the lens apparatus of FIG. 1.
Figure 3:
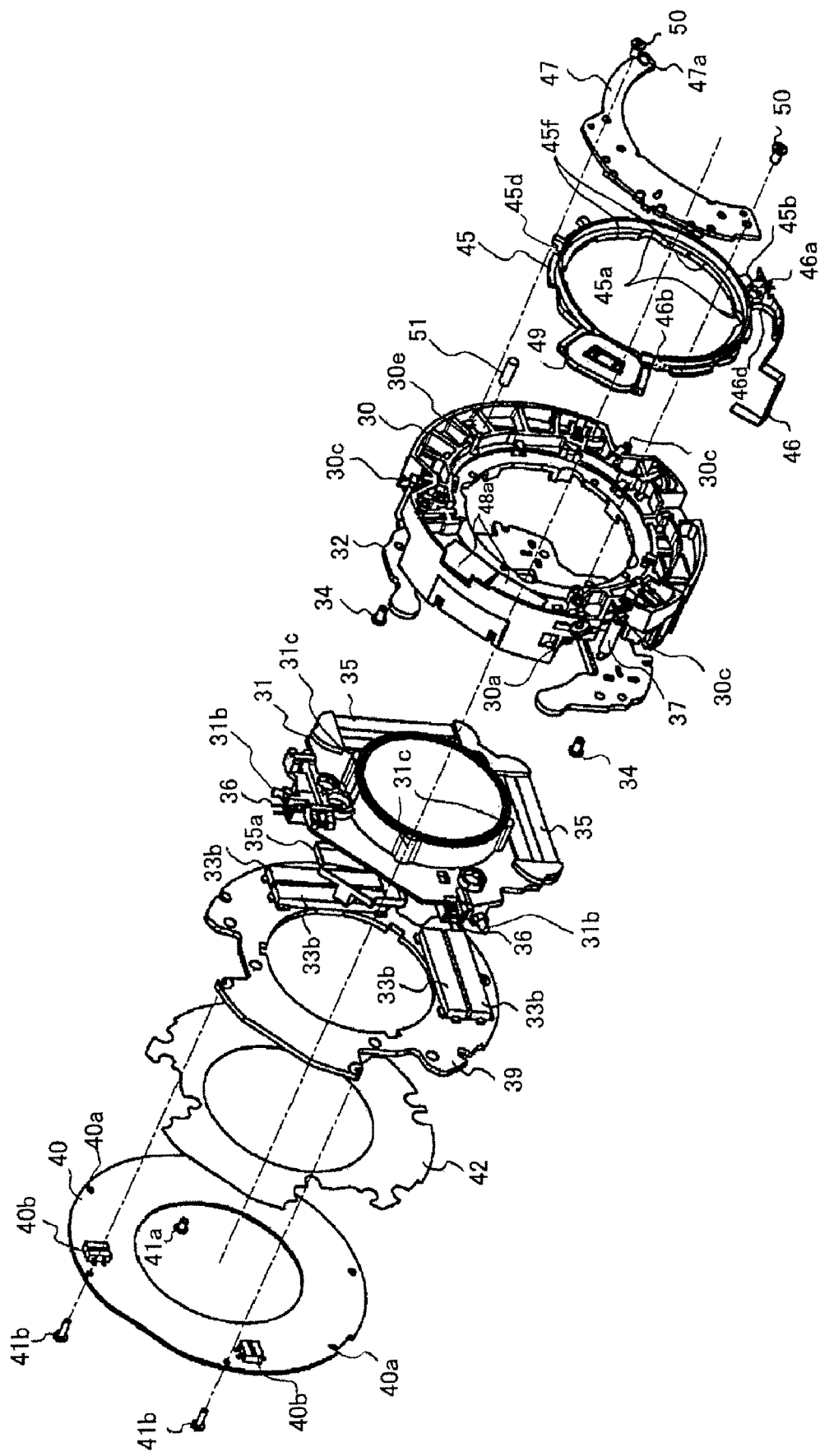
FIG. 3 is an exploded perspective view of the image stabilizing unit viewed from an opposite side in FIG. 2.
Figure 4:
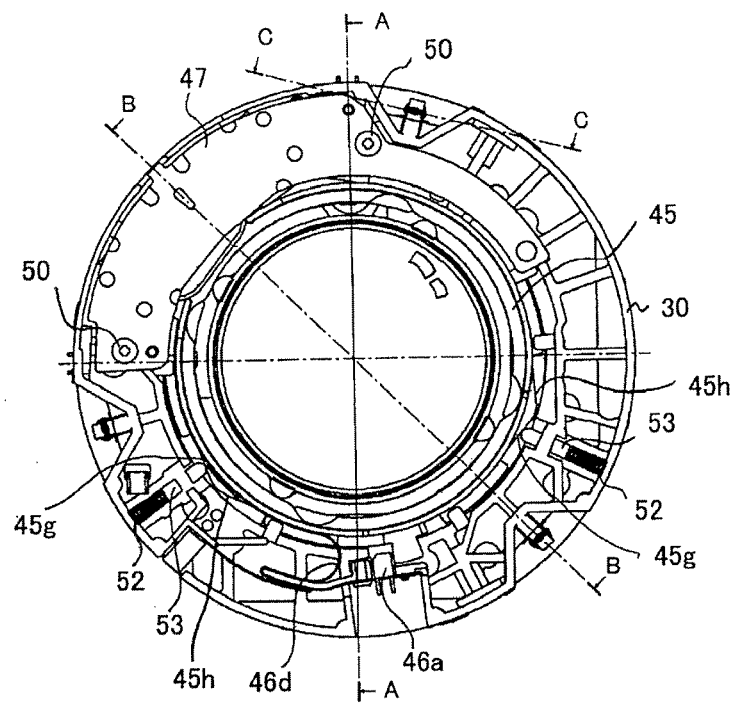
FIG. 4 is a rear view of the image stabilizing unit in the embodiment.
Figure 5:
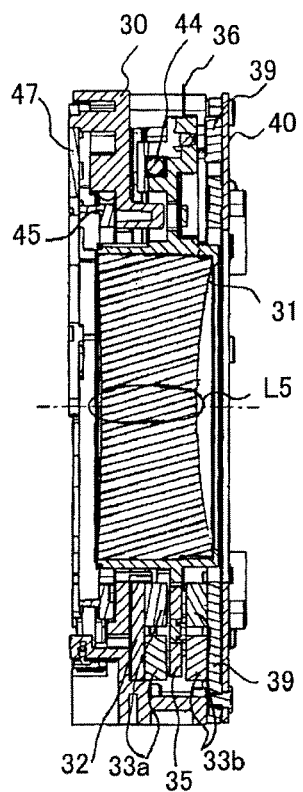
FIG. 5 is a cross-sectional view of the image stabilizing unit in the embodiment taken along line A-A of FIG. 4.
Figure 6:
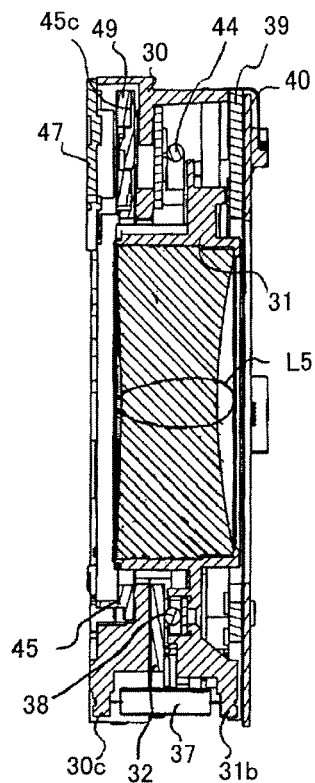
FIG. 6 is a cross-sectional view of the image stabilizing unit in the embodiment taken along line B-B of FIG. 4.
Figure 7:
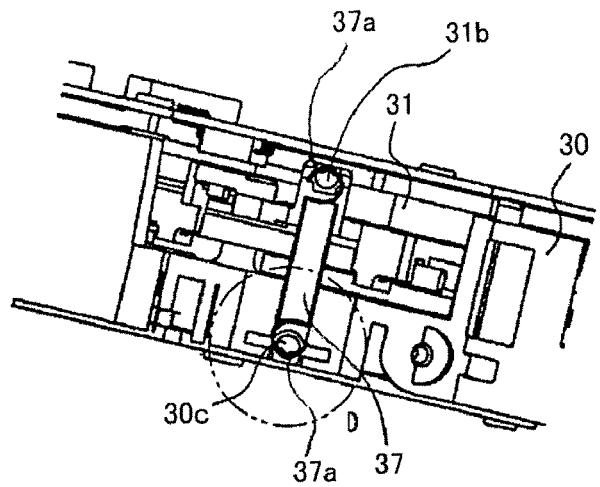
FIG. 7 is a cross-sectional view of the image stabilizing unit in the embodiment taken along line C-C of FIG. 4.

Next, the configuration of the image stabilizing unit 12 will be described with reference to FIGS. 2 to 7. FIG. 2 is an exploded view of the image stabilizing unit 12 which is viewed diagonally from the front side, and FIG. 3 is an exploded view of the image stabilizing unit 12 which is viewed diagonally from the rear side. FIG. 4 is a rear view of the image stabilizing unit 12, and FIG. 5, FIG. 6, and FIG. 7 are cross-sectional views of the image stabilizing unit 12 taken along lines A-A, B-B, and C-C in FIG. 4, respectively.

In these figures, reference numeral 30 denotes a base plate serving as a base member, and as shown in FIGS. 2 and 3, roller portions 30a (three roller portions 30a are provided in reality, but only one of those is shown in the figures) are formed in an outer circumference of the base plate 30. Rollers (not shown) are fixed to the roller portions 30a with screws. The rollers engage with holes formed in the fifth movable barrel 11, and thereby the image stabilizing unit 12 is held by the fifth movable barrel 11.

Reference numeral 32 denotes a first yoke formed of a magnetic member, which is fixed to hole portions 30b formed in the base plate 30 with four screws 34 inserted through holes 32a formed at four places in the first yoke 32. Further, two pairs of permanent magnets (shift magnets) 33a formed of four neodymium magnets or the like magnetically attach on a front surface of the first yoke 32 to be fixed thereon.

The fifth lens unit L5 is an image stabilizing lens serving as an image stabilizing element. The fifth lens unit L5 is held by a shift frame 31. Two shift coils 35 are bonded to be fixed to a front surface of the shift frame 31 so as to face the two pairs of shift magnets 33a. The shift frame 31 can shift with respect to the base plate 30 in a pitch direction and a yaw direction which are perpendicular to an optical axis of the fifth lens unit L5, i.e., the optical axis of the image-pickup optical system (in other words, with respect to the optical axis of the image-pickup optical system).

Further, two light projecting elements 36 such as iREDs are bonded to be fixed to a rear surface of the shift frame 31. Light fluxes projected from the respective light-projecting elements 36 enter into light receiving elements (hereinafter referred to as shift position detecting elements) 40b such as PSDs fixed to a shift base 40, through slits 31a formed in the shift frame 31. The two shift position detecting elements 40b are provided for the two light projecting elements 36. This enables detection of positions of the shift frame 31 in the pitch direction and in the yaw direction.

Ends of coil wires of the respective shift coils 35 and the light projecting elements 36 are soldered to a shift FPC (flexible printed board) 35a.

Protrusions 31b are formed at three places on an outer circumference of the shift frame 31. Further, protrusions 30c are formed at three places corresponding to the three protrusions 31b formed on the base plate 30. As shown in FIG. 7, ends 37a of a shift spring 37 are hooked on each of the protrusions 31b and each of the protrusions 30c. Thereby, the shift frame 31 is always biased toward the base plate 30.

Three balls 38 which can roll with shift of the shift frame 31 with respect to the base plate 30 are arranged between the first yoke 32 and the shift frame 31. The three balls 38 are arranged at same phase positions as those of the three shift springs 37, which reduces shift load of the shift frame 31.

Reference numeral 44 denotes an L-shaped guide shaft formed of a nonmagnetic stainless material. The shift frame 31 holds an end of the guide shaft 44, and a shaft receiving portion (not shown) formed in the base plate 30 holds another end of the guide shaft 44. This allows motion of the shift frame 31 with respect to the base plate 30 in a plane perpendicular to the optical axis, but stops rotation of the shift frame 31 around the optical axis.

Reference numeral 39 denotes a second yoke. The shift base 40 on which the shift position detecting elements 40b, an output amplifier IC (not shown) and connectors 40c are mounted contacts a front surface of the second yoke 39. Inserting positioning dowels 30d formed on the base plate 30 into positioning holes 40a at two places positions the shift base 40 to fix the shift base 40 to the second yoke 39 with two screws 41a. Further, the shift base 40 is joined to the base plate 30 with two screws 41b.

Reference numeral 42 denotes an insulating sheet which prevents unnecessary electrical conduction between the shift base 40 and the second yoke 39.

Two pairs of shift magnets 33b having a same shape as that of the two pairs of shift magnets 33a fixed on the first yoke 32 magnetically attach on a rear surface of the second yoke 39 to be fixed thereon.

The first yoke 32, the shift magnets 33a and 33b, and the second yoke 39 form a closed magnetic circuit. Energizing the shift coils 35 in the closed magnetic circuit drives the shift frame 31 to shift in the pitch direction and in the yaw direction.

The first yoke 32, the shift magnets 33a and 33b, the second yoke 39, and the shift coils 35 constitute an actuator that shifts the shift frame 31 in the pitch direction and in the yaw direction.

In the present embodiment, description will be made of a so-called moving-coil image stabilizing unit in which the shift frame 31 has the shift coils 35 and the base plate 30 (first and second yokes 32 and 39) has the shift magnets 33a and 33b. However, in an alternative embodiment, a so-called moving-magnet image stabilizing unit may be used in which the shift frame 31 has shift magnets and the base plate 30 has shift coils. That is, coils can be provided on one of the shift frame 31 and the base plate 30 and magnets can be provided on the other thereof.

An angular velocity signal from the aforementioned shake sensor is integrated by the control circuit 23, and thereby an angular displacement signal is generated. The control circuit 23 sets, based on the angular displacement signal, a target shift position of the shift frame 31 where an object image is shifted by a same amount as that by which the object image is originally displaced on an image plane due to an angular displacement and where the object image is shifted in a direction opposite to that in which the object image is originally displaced due thereto. The control circuit 23 determines an energization direction and an energization amount of the shift coils 35 so as to reduce a difference between an actual shift position of the shift frame 31 detected by the shift position detecting elements 40b and the target shift position, and then energizes the shift coils 35. In this way, feedback position control of the shift frame 31 (fifth lens unit L5) is preformed, which reduces image shake.

A connection part 35c of the shift FPC 35a is connected to the connector 40c mounted on the shift base 40. This enables energization from the shift base 40 to the light projecting elements 36 and the shift coils 35 which are soldered to the shift FPC 35a. Plural folded portions are formed between the connection part 35c and portions soldered to the light projecting element 36 in the shift FPC 35a, and elasticity of each folded portion prevents the shift FPC 35a from being strained even when the shift frame 31 is shifted.

A first lock yoke (not shown) is fixed to the base plate 30 with screws, and a lock magnet 48a magnetically attaches on the first lock yoke to be fixed thereon.

Reference numeral 45 denotes a lock ring serving as a lock member and is held to be rotatable around the optical axis by an inner circumferential part of the base plate 30. Lock cam portions 45a are formed at four places in the inner circumferential part of the lock ring 45. On an outer circumferential surface of a cylindrical part holding the fifth lens unit L5 formed in the shift frame 31, protrusions 31c are formed at four places which are same phase positions as those of the lock cam portions 45a in a state in which the lock ring 45 rotates to an unlock position, which will be described later.

In a state in which the phase of the lock cam portions 45a of the lock ring 45 displaces from that of the protrusions 31c of the shift frame 31, each protrusion 31c contacts (engages with) or comes close to an inner circumferential surface 45f of the lock ring 45. This state limits shift of the shift frame 31 in the pitch and yaw directions. This state is called a locked state, and a rotational position of the lock ring 45 in this state is called a lock position.

In a state in which the phase of the lock cam portions 45a of the lock ring 45 coincides with that of the protrusions 31c of the shift frame 31, each protrusion 31c is located inside each lock cam portion 45a with a predetermined gap therefrom. This state allows the shift frame 31 to shift in the pitch and yaw directions. This state is called an unlocked state, and a rotational position of the lock ring 45 in this state is called an unlock position (lock-releasing position).

A lock coil 49 is bonded to a rear surface of a planar portion 45c of the lock ring 45 to be fixed thereto. An end of the coil wire of the lock coil 49 is soldered to an exposed portion 46b of a lock FPC 46 attached to an outer circumference of the lock ring 45.

A photo interrupter 46a serving as a detector for detecting the rotational position of the lock ring 45 is mounted on the lock FPC 46. The photo interrupter 46a detects the rotational position (the lock position and the unlock position) of the lock ring 45 by switching from a light-shielded state to a light-received state when a light-shielding portion 45b formed on the lock ring 45 passes through between a light projecting part and a light receiving part of the photo interrupter 46a.

In the present embodiment, signals output from the photo interrupter 46a at the lock position and the unlock position are both light-received signals (signals when the light receiving part receives light projected from the light projecting part). Therefore, the control circuit 23 determines whether the lock ring 45 is at the lock position and the unlock position with reference to signals from the shift position detecting elements 40b that detect the shift position of the shift frame 31. For example, when the shift position of the shift frame 31 is close to the optical axis of the image-pickup optical system in a state in which the light-received signal is output from the photo interrupter 46a, the control circuit 23 determines that the lock ring 45 is at the lock position. When the shift position of the shift frame 31 is away from the optical axis of the image-pickup optical system in the same state, the control circuit 23 determines that the lock ring 45 is at the unlock position.

A U-turn part 46d elastically deformable with rotation of the lock ring 45 is formed in the lock FPC 46, which prevents the lock FPC 46 from being strained.

Reference numeral 51 denotes a lock rubber (elastic member) which blocks a rotation of the lock ring 45 exceeding the lock position and a rotation thereof exceeding the unlock position. A method for attaching the lock rubber 51 to the base plate 30 will be described later.

A lock magnet 48b magnetically attaches on the front surface of the second lock yoke 47 to be fixed thereon. The first lock yoke, the lock magnet 48a, the second lock yoke 47, and the lock magnet 48b form a closed magnetic circuit. Energization of the lock coil 49 in the closed magnetic circuit enables rotation of the lock ring 45 between the lock position and the unlock position.

The first lock yoke, the lock magnet 48a, the second lock yoke 47, the lock magnet 48b, and the lock coil 49 constitute an actuator that rotates the lock ring 45.

As shown in FIG. 4, lock sliders 53 formed of resin with slidability are held so as to be movable in a radial direction of the base plate 30 in concave portions formed in circumferential three places of the base plate 30 (only two of the three lock sliders 53 are shown in FIG. 4). The respective lock sliders 53 are biased inward in the radial direction of the base plate 30 (i.e., toward a rotation center of the lock ring 45) by lock springs 52 serving as biasing members provided in the concave portions. On the other hand, at each of three places on an outer circumferential surface of the lock ring 45, cam surfaces 45h and 45g serving as inclined surfaces which the lock slider 53 contacts. The cam surfaces 45h and 45g which are different surfaces from one another are inclined with respect to a radial direction of the lock ring 45 and disposed to be adjacent to one another so as to form a convex shape projecting outward in the radial direction.

Figure 9:
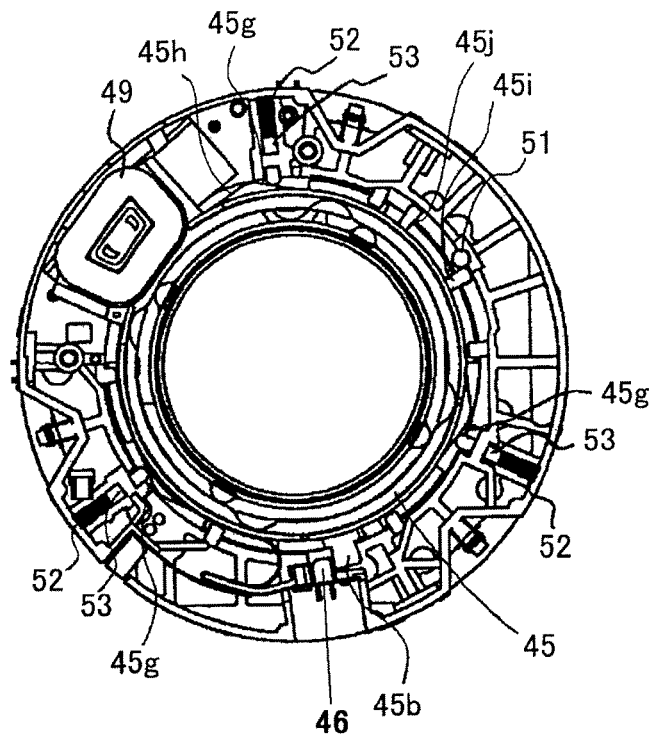
FIG. 9 is a rear view showing a locked state in the image stabilizing unit in the embodiment.

As shown in FIGS. 4 and 9, in a state in which the lock ring 45 is rotated at the lock position or a position close thereto, each lock slider 53 contact each cam surface 45g of the lock ring 45. The cam surface 45g converts biasing force acting on the lock ring 45 inward in the radial direction (i.e., toward the rotation center of the lock ring 45) received from the lock slider 53 into rotating force acting thereon toward the lock position (i.e., in a counterclockwise direction in the figures). Thereby, the lock ring 45 is stably held at the lock position in a non-energized state of the lock coil 49. That is, in the locked state, even if the lock ring 45 is slightly rotated toward the unlock position due to external force such as impact applied to the lens apparatus, the lock ring 45 is returned to the lock position by the biasing force toward the lock position.

Figure 10:
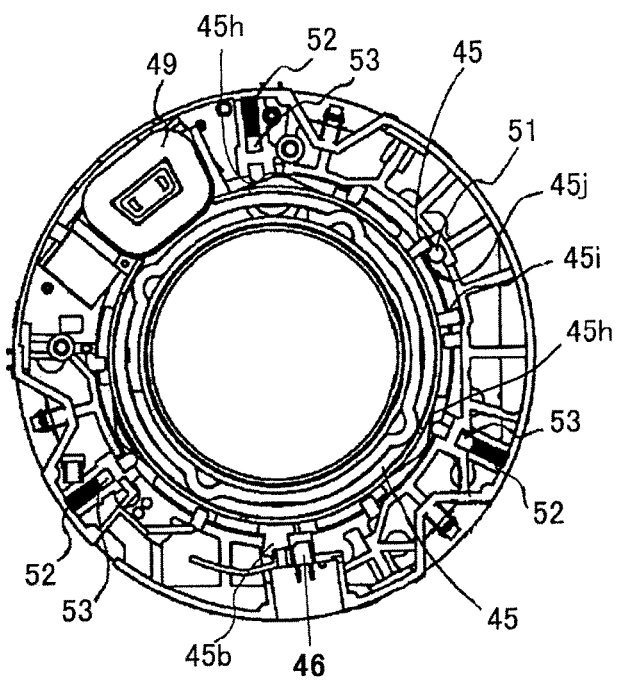
FIG. 10 is a rear view showing an unlocked state in the image stabilizing unit in the embodiment.

As shown in FIG. 10, in a state in which the lock ring 45 is rotated at the unlock position or a position close thereto, each lock slider 53 contacts each cam surface 45h. The cam surface 45h converts the biasing force acting on the lock ring 45 inward in the radial direction received from the lock slider 53 into rotating force acting thereon toward the unlock position (i.e., in a clockwise direction in the figure). Thereby, the lock ring 45 is stably held at the unlock position even in the non-energized state of the lock coil 49. That is, in the unlocked state, even if the lock ring 45 is slightly rotated toward the lock position due to the external force such as impact applied to the lens apparatus, the lock ring 45 is returned to the unlock position by the biasing force toward the unlock position.

Accordingly, during an image stabilizing operation of the image stabilizing unit 12 (during a shift operation of the shift frame 31), the lock ring 45 is prevented from staying at a position rotated toward the lock position by the external force, which makes it possible to continue an appropriate image stabilizing operation.

Such a configuration achieves that the lock ring 45 is biased toward the lock position and the unlock position by using the same lock spring 52. The lock sliders 53, the lock springs 52, and the cam surfaces 45h and 45g constitute biasing mechanisms.

Although the lock ring 45 and the base plate 30 have a certain backlash therebetween, the biasing mechanisms biasing the lock ring 45 at the circumferential three places prevent displacements of the lock ring 45 in its circumferential direction.

Figure 8:
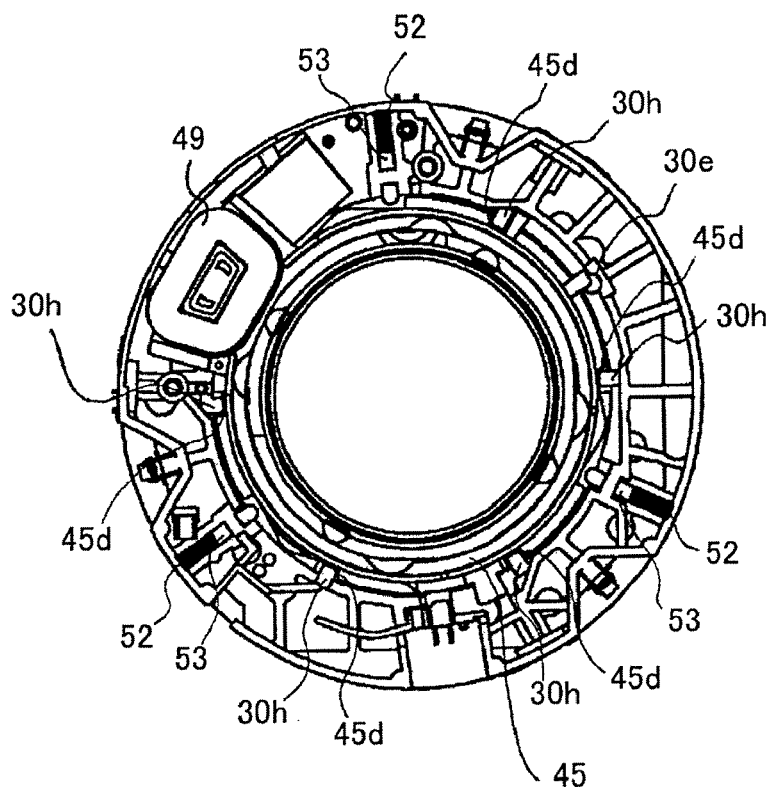
FIG. 8 is a rear view showing a state in which a lock ring is built into the image stabilizing unit in the embodiment.

Next, description will be made of procedures for attaching the lock ring 45, the lock springs 52, the lock sliders 53, and the lock rubbers 51 onto the base plate 30 with reference to FIGS. 8 to 10.

First, the lock springs 52 and the lock sliders 53 are arranged in the concave portions formed in the base plate 30. Next, the phase of concave portions 45d formed at five places on the outer circumference of the lock ring 45 is adjusted to that of protrusions 30h formed at five places on the inner circumference of the base plate 30, and then the lock ring 45 is pressed into the base plate 30. Although tips of the lock sliders 53 contact the outer circumferential surface of the lock ring 45 in this procedure, the tips of the lock sliders 53 are formed in a hemispherical shape and portions of the lock ring 45 where the lock sliders 53 contact are formed as curved surfaces, so that the lock ring 45 can be smoothly assembled into the base plate 30.

Thereafter, the lock ring 45 is rotated toward the unlock position (in the clockwise direction in FIG. 8) to be bayonet-connected to the base plate 30. Thereby, the lock ring 45 is held rotatably around the optical axis in a state where displacement of the lock ring 45 in the optical axis direction with respect to the base plate 30 is prevented.

Then, as shown in FIG. 9, one end of the lock rubber 51 is inserted into a hole 30e formed in the base plate 30. This can prevent the lock ring 45 from dropping off from the base plate 30 by disengagement of the bayonet connection when the lock ring 45 rotates in the counterclockwise direction so that the phase of the concave portions 45d coincides with that of the protrusions 30h.

The lock rubber 51 is bonded to a wall portion formed so as to surround an approximately half round part of the hole 30e in the base plate 30. This prevents the lock rubber 51 from inclining with respect to the base plate 30. Then, when the second lock yoke 47 is fixed to the base plate 30 with two screws 50, another end of the lock rubber 51 is located inside a concave portion 47a formed in the second lock yoke 47, and the lock rubber 51 is sandwiched so as to be slightly charged in the optical axis direction between the base plate 30 and the second lock yoke 47. This prevents the lock rubber 51 from dropping off from the base plate 30.

A protrusion 45i formed on the lock ring 45 contacts the lock rubber 51 attached to the base plate 30 in this way at the lock position shown in FIG. 9 to prevent rotation of the lock ring 45 exceeding the lock position. Further, a protrusion 45j formed on the lock ring 45 contacts the lock rubber 51 at the unlock position shown in FIG. 10 to prevent rotation of the lock ring 45 exceeding the unlock position.

Even if the protrusions 45i and 45j formed on the lock ring 45 rotationally driven by energization of the lock coil 49 collide against the lock rubber 51, collision sound is hardly generated because the lock rubber 51 is formed of an elastic member (rubber).

Further, during rotation of the lock ring 45 between the lock position and the unlock position (hereinafter referred to as a mid-rotation state), the light-shielding portion 45b of the lock ring 45 is located between the light projecting part and the light receiving part of the photo interrupter 46a to block the light proceeding from the light projecting part toward the light receiving part. When the control circuit 23 detects that the lock ring 45 has stopped in the mid-rotation state due to external force or the like through the photo interrupter 46a, the control circuit 23 energizes the lock coil 49 so as to rotate the lock ring 45 again in a same direction as that of rotation immediately before the stopping. The rotational direction immediately before the stopping can be stored in a memory provided in the control circuit 23.

Further, from a standpoint of preventing trouble, when the lock ring 45 has stopped in the mid-rotation state, the lock ring 45 may be rotated again to the lock position regardless of the rotational direction immediately before the stopping.

As described above, according to the present embodiment, since the biasing mechanism is provided which mechanically biases the lock ring 45 serving as a lock member toward the lock position and the unlock position, the lock ring 45 can be stably held at the lock position and the unlock position while reducing power consumption. This can achieve power saving of the lens apparatus and realize a lens apparatus capable of continuing image pickup with less image shake even when external force such as impact is applied thereto.

Further, since the biasing mechanism in the present embodiment biases the lock ring 45 toward the lock position and the unlock position using the same lock spring 52 and the same lock slider 53, the biasing mechanism can be configured with a small number of parts, resulting in a simple and compact configuration. This enables reduction in size of the image stabilizing unit 12 and the lens apparatus having the same.

Further, the lock slider 53 constituting part of the biasing mechanism is formed of resin with slidability, and the lock rubber 51 that blocks rotation of the lock ring 45 exceeding the lock position and the unlock position is formed of rubber (elastic member). This can realize the image stabilizing unit 12 and the lens apparatus having the same which generate less abnormal noise.

Further, the biasing mechanism converts the biasing force of the lock spring 52 acting toward the rotation center of the lock ring 45 into biasing force acting in the rotational direction by the cam surfaces 45h and 45g formed on the lock ring 45. This can achieve a more compact configuration of the biasing mechanism. This also can reduce unnecessary displacement of the lock ring 45 with respect to the base plate 30, which makes it possible to smoothly bias the lock ring 45 in its rotational direction.

Further, in a case where the lock ring 45 stops in the mid-rotation state, the control circuit 23 detects the stopping and then controls the actuator (energization of the lock coil 49) so as to cause the lock ring 45 to rotate again. Therefore, even if the lock ring 45 stops in the mid-rotation state due to the external force such as impact, the lock ring 45 can be immediately rotated to the lock position or the unlock position.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

For example, the above embodiment described the case where the biasing mechanisms are provided at three places in the circumferential direction of the lock ring 45. However, the biasing mechanism may be provided at at least one place in the circumferential direction. Further, instead of the lock spring 52, other biasing members such as rubber members or springs may be used.

Moreover, the above embodiment described the image stabilizing unit mounted on the interchangeable lens. However, the present invention can be applied to an optical image stabilizer mounted on an image-pickup apparatus (optical apparatus) such as a lens-integrated digital still camera and a video camera.

Further, the above embodiment described the case where the lens is used as an image stabilizing element. However, the present invention can be applied to a case where an image-pickup element such as a CCD sensor and a CMOS sensor is used as an image stabilizing element and the image stabilizing element is shifted with respect to the optical axis of the image-pickup optical system to reduce image shake.

This application claims the benefit of Japanese Patent Application No. 2008-009759, filed on Jan. 18, 2008, which is hereby incorporated by reference herein in its entirety.

What is claimed is:

1. An optical image stabilizer which shifts an image stabilizing element with respect to an optical axis of an optical system to reduce image shake, comprising:

a lock ring which is rotatable to a lock position to limit shift of the image stabilizing element and to a lock-releasing position to allow the shift of the image stabilizing element;

an actuator which rotates the lock ring to the lock position and to the lock-releasing position; and a biasing mechanism which mechanically generates a biasing force towards the lock ring;

a cam which is formed in the lock ring and converts the biasing force from the biasing mechanism into a rotational biasing force towards a rotational direction of the lock ring, and a blocking member which stops rotation of the lock ring by the biasing mechanism and the cam at the lock position and at the lock-releasing position.

2. The optical image stabilizer according to claim 1,
wherein the biasing mechanism biases the lock ring toward the lock position and biases the lock ring toward the lock-releasing position by using a same biasing member.

3. The optical image stabilizer according to claim 2,
wherein the biasing member generates the biasing force toward a rotation center of the lock ring.

4. The optical image stabilizer according to claim 1,
wherein the actuator includes a coil provided to one of the lock ring and a base member which rotatably holds the lock ring, and a magnet provided to the other one of the lock ring and the base member.

5. The optical image stabilizer according to claim 1, wherein the blocking member includes an elastic member and a protrusion formed on the lock ring, and
wherein the protrusion contacts the elastic member to stop the rotation of the lock ring.

6. The optical image stabilizer according to claim 1,
wherein the biasing mechanism includes a lock slider biased toward an outer circumferential surface of the lock ring.

7. The optical image stabilizer according to claim 6,
wherein the lock slider is held by a base plate arranged at an outer circumference of the lock ring, and is biased toward a rotation center of the lock ring by the biasing mechanism.

8. The optical image stabilizer according to claim 6,
wherein the lock ring has a first inclined surface and a second inclined surface which are surfaces that the lock slider contacts,
wherein the biasing mechanism is configured to bias the lock ring toward the lock position by biasing the lock slider toward the first inclined surface, and to bias the lock ring toward the lock-releasing position by biasing the lock slider toward the second inclined surface, and
wherein the lock slider is biased toward the rotation center of the lock ring.

9. The optical image stabilizer according to claim 8,
wherein the first inclined surface and the second inclined surface are surfaces which are different from one another and are inclined with respect to a radial direction of the lock ring, and
wherein the first and second inclined surfaces are disposed to be mutually adjacent so as to form a convex shape projecting outward in the radial direction.

10. The optical image stabilizer according to claim 1, further comprising:
a detector which detects a rotational position of the lock ring,
wherein, when the detector detects that the lock ring stops between the lock position and the lock-releasing position, the actuator rotates the lock ring again.

11. An optical apparatus comprising:
an optical image stabilizer which shifts an image stabilizing element with respect to an optical axis of an optical system to reduce image shake,
wherein the optical image stabilizer includes:
a lock ring which is rotatable to a lock position to limit shift of the image stabilizing element and to a lock-releasing position to allow the shift of the image stabilizing element;
an actuator which rotates the lock ring to the lock position and the lock-releasing position;
a biasing mechanism which mechanically generates a biasing force towards the lock ring;
a cam which is formed in the lock ring and converts the biasing force from the biasing mechanism into a rotational biasing force towards a rotational direction of the lock ring; and
a blocking member which stops rotation of the lock ring by the biasing mechanism and the cam at the lock position and at the lock-releasing position.

12. An optical image stabilizer which shifts an image stabilizing lens with respect to an optical axis of an optical system to reduce image shake, comprising:
a shift frame which holds the image stabilizing lens and includes protrusions;
a lock ring which is rotatable to a lock position where an inner circumferential surface contacts or comes close to each protrusion to limit shift of the image stabilizing lens and to a lock-releasing position where the inner circumferential surface is located with a predetermined gap from each protrusion to allow the shift of the image stabilizing lens;
an actuator which rotates the lock ring to the lock position and the lock-releasing position;
a biasing mechanism which mechanically generates a biasing force towards the lock ring;
a cam which is formed in the lock ring and converts the biasing force from the biasing member into a rotational biasing force towards a rotational direction of the lock ring;
a first protrusion formed on the lock ring;
a second protrusion formed on the lock ring; and
a contact member which contacts the first protrusion formed on the lock ring to prevent rotation of the lock ring by the biasing mechanism and the cam to hold the lock position, and contacts the second protrusion formed on the lock ring to prevent rotation of the lock ring by the biasing mechanism and the cam to hold the lock releasing position.

* * * * *